March 7, 1967  L. W. HENNINGS  3,307,235
CLAMPING DEVICE
Filed Feb. 23, 1965
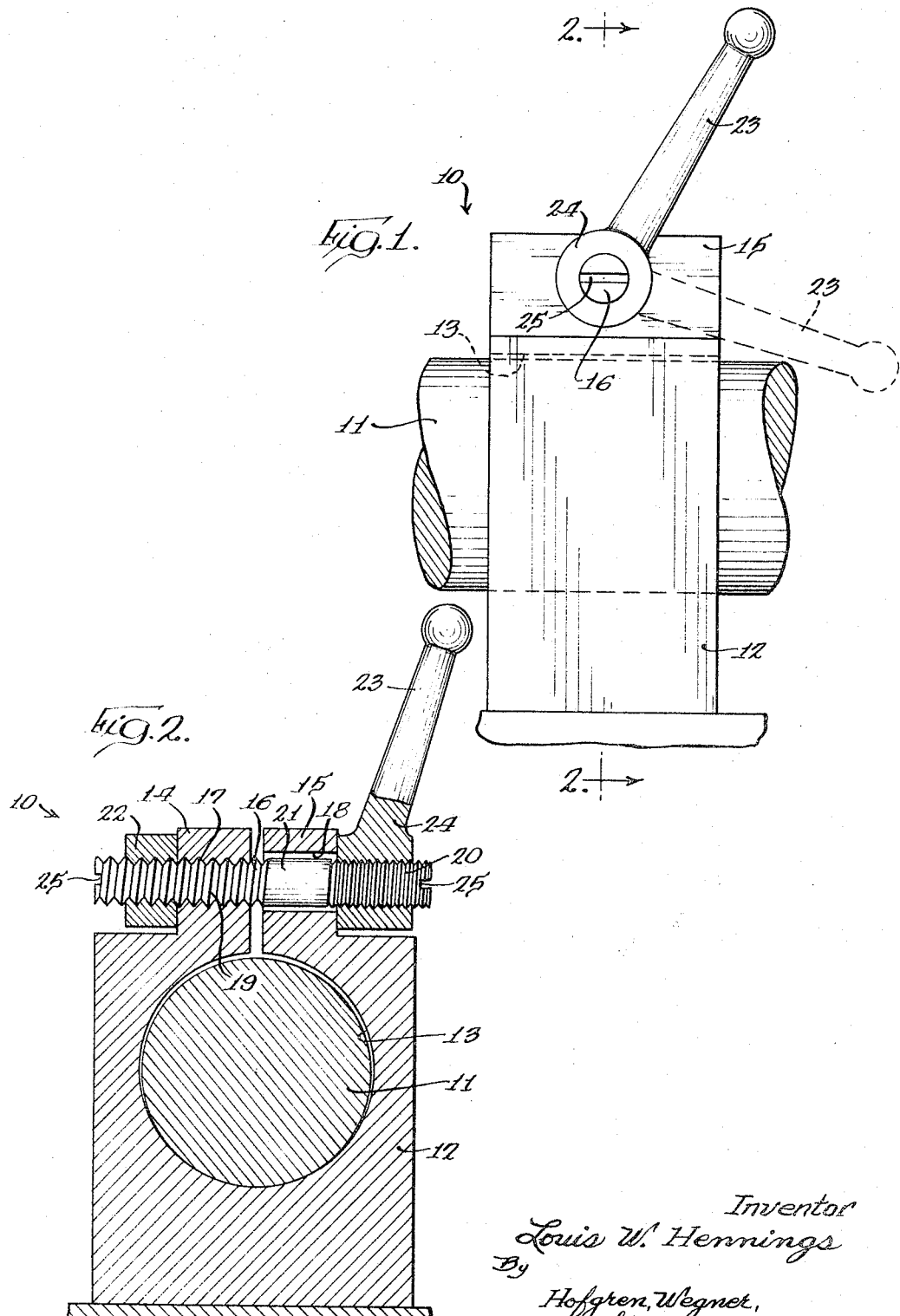
Inventor
Louis W. Hennings
By
Hofgren, Wegner,
Allen, Stellman & McCord
Attys

United States Patent Office 3,307,235
Patented Mar. 7, 1967

3,307,235
CLAMPING DEVICE
Louis W. Hennings, Marion, Va., assignor to Brunswick Corporation, a corporation of Delaware
Filed Feb. 23, 1965, Ser. No. 434,357
3 Claims. (Cl. 24—243)

This invention relates to a clamping device and, more particularly, to a clamping device having a novel wear take-up adjustment.

An object of this invention is to provide a clamping device having a handle operated clamp action with threaded means providing for easy take-up adjustment to accommodate for wear of the parts.

Another object of the invention is to provide a clamping device utilizing a differential screw with one part providing the clamping action upon rotation of a handle and the other part providing take-up adjustment resulting from wear.

Still another object of the invention is to provide a clamping device having a new and improved means for tightening said clamp by the adjustment of a partially threaded stud which, in turn, permits the adjustment of the orientation of the clamp tightening handle.

Further objects and advantages will become apparent from the following detailed description taken in connection with the accompanying drawing in which:

FIG. 1 is a side elevational view of the clamping device; and

FIG. 2 is a sectional view taken generally along the line 2—2 in FIG. 1.

While this invention is susceptible of embodiment in many different forms, there is shown in the drawing and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

The clamping device as disclosed herein is indicated generally at 10 and is shown in association with a shaft 11 having either rotational or longitudinal movement which is to be prevented by the clamp device. The clamp device has a body 12 having a bore or an interior opening 13 for receiving the shaft 11 and a pair of clamping members in the form of split legs 14 and 15 which can be drawn toward each other to clamp the shaft 11, but upon release, spring away from each other sufficiently to permit movement of the shaft. The position of the legs 14 and 15 relative to each other is determined by mechanism including a stud 16 extending through aligned openings 17 and 18 in the legs 14 and 15, respectively. The stud is threaded adjacent both ends thereof with the threads 19 being in one area of the stud and the threads 20 being adjacent the opposite end. The threads 19 engage similar threads formed within the opening 17 to locate the stud in proper position while an unthreaded portion 21 of the stud is positioned within the leg opening 18 in spaced relation thereto. The stud is held against rotation by a lock nut 22 engaging the threads 19 to prevent rotation of the stud. The legs 14 and 15 of the clamping device are urged toward each other to clamp the shaft 11 by a handle 23 having a nut formation 24 with interior threads engaging the threads 20 of the stud. With the handle 23, shown in full line in FIG. 1, the clamp device is positioned to clamp the shaft 11 while movement of the handle to the broken line position of FIG. 1 results in moving the nut portion 24 away from the clamp leg 14 to release the shaft.

After a period of use, wear can result in the handle 23 being ineffective to provide the proper tightening action of the clamp. A feature of this invention is the utilization of the threaded portion 19 of the stud which permits rotation of the stud to shift the stud toward the left, as viewed in FIG. 2, after backing off of the lock nut 22. The threads 19 are of a lead greater than that of threads 20 whereby, should the handle 23 strike the corner of the block 12 before fully clamping the shaft, the stud can be rotated in a counterclockwise direction, as viewed in FIG. 1, to reorient the handle for moving to a fully clamped position. The action of this device depends on the difference in lead of the respective screw threads 19 and 20 on the opposite ends of the stud 16 and the threads may be either right or left hand or may be of opposite hand on the opposite ends. The rotation of the stud 16 is facilitated by the slots 25 at opposite ends thereof.

From the foregoing, it will be seen that this device employs a differential screw principle to provide a convenient means of adjustment of the position of the screw to facilitate the use of the clamping means when rotation of the clamping handle is restricted from full 360°.

I claim:

1. A clamping device having a pair of spaced-apart clamping members each having an opening in alignment with the other, a stud extending through said openings and having threads adjacent the ends thereof, the threads adjacent one of said ends being of relatively larger lead than the threads adjacent the other of said ends, means coacting with said threads having said larger lead for locking said stud in place, the threads of relatively smaller lead extending through one of said members sufficiently far to accommodate a handle nut for opening and closing of said clamp device, and there being screwdriver slots at the ends of said stud for rotating said stud when said means for locking said stud are released to provide take-up adjustment of said clamp device.

2. A clamping device having a pair of spaced-apart clamping members each having an opening in alignment with the other, a stud extending through said openings and having threads adjacent the ends thereof, the threads adjacent one of said ends being of relatively larger lead than threads adjacent the other of said ends, means coacting with said threads having said larger lead for locking said stud in place, the threads of relatively smaller lead extending loosely through one of said members sufficiently far to mount a handle nut engageable with said one member for opening and closing of said clamp device by rotation of the nut, and means at at least one end of said stud for rotating said stud when said means for locking said stud are released to provide take-up adjustment of said clamp device.

3. A clamping device having a pair of spaced-apart clamping members each having an opening in alignment with the other, a stud extending through said openings and having threads adjacent the ends thereof, the threads adjacent one of said ends being of relatively larger lead than threads adjacent the other of said ends, means coacting with the threads of one lead for locking said stud in place, the threads of the other lead extending loosely through one of said members sufficiently far to accommodate a handle nut for opening and closing of said clamp device, and means at one of the ends of said stud for rotating said stud when said means for locking said stud are released to provide take-up adjustment of said clamp device.

References Cited by the Examiner

UNITED STATES PATENTS

| | | | |
|---|---|---|---|
| Re. 19,386 | 11/1934 | Hand et al. | 24—243 |
| 584,872 | 6/1897 | Harrison | 269—241 |
| 1,017,131 | 2/1912 | Buchanan | 269—245 X |
| 1,539,826 | 6/1925 | Boutelle. | |
| 1,780,366 | 11/1930 | Showers | 269—243 X |

FOREIGN PATENTS

| | | |
|---|---|---|
| 89,845 | 1/1897 | Germany. |
| 118,818 | 3/1901 | Germany. |

WILLIAM FELDMAN, *Primary Examiner.*

DONALD A. GRIFFIN, *Examiner.*